United States Patent
Balgi et al.

(10) Patent No.: US 12,204,439 B2
(45) Date of Patent: Jan. 21, 2025

(54) METHOD AND APPARATUS FOR GENERATING TEST SCRIPTS

(71) Applicant: Dell Products L.P., Round Rock, TX (US)

(72) Inventors: Yogesh Balgi, Honavar (IN); Raghavendra Phayde, Belve (IN); Sourabha Murthy, Bangalore (IN); Manimaran Mohankumar, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 103 days.

(21) Appl. No.: 18/159,845

(22) Filed: Jan. 26, 2023

(65) Prior Publication Data
US 2024/0256431 A1     Aug. 1, 2024

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 2013/0042222 A1* | 2/2013 | Maddela | ............. | G06F 11/3684 717/124 |
| 2013/0055029 A1* | 2/2013 | Lawrance | ........... | G06F 11/3664 714/E11.208 |
| 2013/0318499 A1* | 11/2013 | Hemed | ............... | G06F 11/3684 717/124 |
| 2014/0013164 A1* | 1/2014 | Ma | ...................... | G06F 11/3688 714/E11.208 |
| 2015/0324276 A1* | 11/2015 | Rumble | ............. | G06F 11/3684 714/38.14 |
| 2016/0132426 A1* | 5/2016 | Crawshay | ........... | G06F 11/3688 714/38.1 |
| 2019/0213116 A1* | 7/2019 | Kulkarni | ............. | G06F 11/3684 |

\* cited by examiner

*Primary Examiner* — Qing Chen
*Assistant Examiner* — Clint Thatcher
(74) *Attorney, Agent, or Firm* — Daly, Crowley, Mofford & Durkee, LLP

(57) ABSTRACT

A method including: receiving a first test case identifying a plurality of test case steps; generating a plurality of first signatures; generating a plurality of second signatures; processing any given one of the plurality of test case steps, wherein the processing includes: (i) identifying a matching score that corresponds to the given test case step, the matching score being indicative of a degree of similarity between one of the plurality of first signatures that corresponds to the given test case step and a respective one of the plurality of second signatures, (ii) detecting whether the matching score satisfies a predetermined condition, and (iii) inserting a respective one of the plurality of testing functions that corresponds to the respective second signature into a first automated test script; and outputting the first automated test script.

20 Claims, 7 Drawing Sheets

AUTOMATED FUNCTION LIBRARY — 212

302

```
@given('execute inline to fetch guest details')
                                              ←—303
def step_impl(context):           ←—304
    context.openmax.log.info("Selected to get the guest details")
    context.guest_details_resources =
context.openmax.getGostDetails(context.openmax.box)
    context.stack = {}
```

302

```
@then('collect all the certs from "{node}" guest')
                                              ←—303
def step_impl(context, node):     ←—304
    context.openmax.log.info("collecting all certs")
    assert
context.openmax.downloadVPCertificates(node=node)
```

302

```
@then('verify dashboard details for "{node}"')
                                              ←—303
def step_impl(context, node):     ←—304
    context.openmax.log.info("Checking the dashboard details
for vapp for node :" + node)
    content_symm =
context.openmax.getVappDashboardDetails(option="SYMMET
RIX", guest=node)
    ssn = context.openmax.config['symm']['ssn']
    match = re.search(ssn, content_symm)
```

302

```
@then("VASA U4P: clear temp file for {guest}")
                                              ←—303
def step_impl(context, guest):    ←—304
    context.openmax.log.info("Function to clear temp files in
"+guest+" from U4P ")
    assert context.openmax.clear_temp_files(guest=guest)
```

FIG. 3

METHOD AND APPARATUS FOR GENERATING TEST SCRIPTS

BACKGROUND

Software testing is an investigation conducted to assess the quality of software. Software testing can be a labor-intensive process, as the testing of complex software may require the execution of hundreds and even thousands of tests. The use of automated testing platforms may help increase the efficiency at which software testing is performed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: receiving a first test case identifying a plurality of test case steps; generating a plurality of first signatures, each of the plurality of first signatures being generated based on a different one of the plurality of test case steps; generating a plurality of second signatures, each of the plurality of second signatures corresponding to a different one of a plurality of testing functions, each of the plurality of second signatures being generated based on a respective label that is associated with the testing function that corresponds to the second signature; processing any given one of the plurality of test case steps, wherein the processing includes: (i) identifying a matching score that corresponds to the given test case step, the matching score being indicative of a degree of similarity between one of the plurality of first signatures that corresponds to the given test case step and a respective one of the plurality of second signatures, (ii) detecting whether the matching score satisfies a predetermined condition, and (iii) inserting a respective one of the plurality of testing functions that corresponds to the respective second signature into a first automated test script, the respective testing function being inserted only when the predetermined condition is satisfied; and outputting the first automated test script.

According to aspects of the disclosure, a system is provided comprising: a memory; and at least one processor operatively coupled to the memory, the at least one processor being configured to perform the operations of: receiving a first test case identifying a plurality of test case steps; generating a plurality of first signatures, each of the plurality of first signatures being generated based on a different one of the plurality of test case steps; generating a plurality of second signatures, each of the plurality of second signatures corresponding to a different one of a plurality of testing functions, each of the plurality of second signatures being generated based on a respective label that is associated with the testing function that corresponds to the second signature; processing any given one of the plurality of test case steps, wherein the processing includes: (i) identifying a matching score that corresponds to the given test case step, the matching score being indicative of a degree of similarity between one of the plurality of first signatures that corresponds to the given test case step and a respective one of the plurality of second signatures, (ii) detecting whether the matching score satisfies a predetermined condition, and (iii) inserting a respective one of the plurality of testing functions that corresponds to the respective second signature into a first automated test script, the respective testing function being inserted only when the predetermined condition is satisfied; and outputting the first automated test script.

According to aspects of the disclosure, a non-transitory computer-readable medium storing a plurality of processor-executable instructions, which, when executed by at least one processor, cause the at least one processor to perform the operations of: receiving a first test case identifying a plurality of test case steps; generating a plurality of first signatures, each of the plurality of first signatures being generated based on a different one of the plurality of test case steps; generating a plurality of second signatures, each of the plurality of second signatures corresponding to a different one of a plurality of testing functions, each of the plurality of second signatures being generated based on a respective label that is associated with the testing function that corresponds to the second signature; processing any given one of the plurality of test case steps, wherein the processing includes: (i) identifying a matching score that corresponds to the given test case step, the matching score being indicative of a degree of similarity between one of the plurality of first signatures that corresponds to the given test case step and a respective one of the plurality of second signatures, (ii) detecting whether the matching score satisfies a predetermined condition, and (iii) inserting a respective one of the plurality of testing functions that corresponds to the respective second signature into a first automated test script, the respective testing function being inserted only when the predetermined condition is satisfied; and outputting the first automated test script.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of an example of an automated function library, according to aspects of the disclosure;

DETAILED DESCRIPTION

In traditional Behavior Driven Development (BDD) automation, each automated test script is written afresh from the corresponding test case. Reusability is present in the underlying BDD-based automation framework libraries, but not at the "test script level". In this regard, the present disclosure provides a method and apparatus for identifying and re-using existing test script functions and leveraging them to create new automated test scripts.

In one aspect, for a development team to automate any test case in a BDD-based automation framework, the team has to perform the following steps: First, a product engineer must write the test case with appropriate test steps and load the test case into a test case (TC) repository. Next, an automation engineer must manually go through the test case steps from the TC repository and manually compare each of the test case steps with automated testing functions that are present in the automation framework to know if that test case step is already automated. And finally, the engineer must manually create an automated test script for the test case by using automation libraries that automate the steps in the test case. As can be readily appreciated, the manual creation of automated test scripts can be time-consuming and costly.

In another aspect, due to a gap or lack of bridging between the test case writing process and the test case automation process, there may be a duplication of effort in writing automated test libraries. For example, because a development engineer is unable to find an existing automation library for a particular test case step, the engineer might end up writing the existing automation library anew. In other words, because existing automation libraries are not leveraged efficiently, bottlenecks may be created in BDD automation, resulting in a slowdown of the automation process and prolonged release cycles.

According to the present disclosure, an automated method and system are provided that takes test case steps as input and automatically creates automated test script files as output. The automated test script files are generated by using machine learning to find the automated function that best matches each (or some) of the steps in a test case, after which the identified automated functions are added to an automated test script for the test case. In some respects, the automated method and system address the deficiencies in the manual process for generating test scripts by making it easier to find test script functions that match different test case steps, thus decreasing the cost and time it takes to create the automated test script, while also decreasing the probability of duplication of effort in generating the automated test script.

Figure 1:
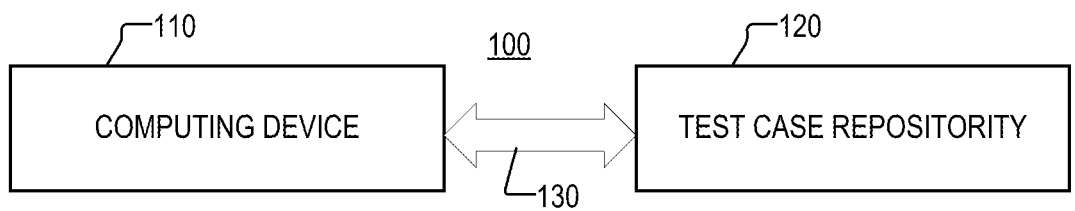
FIG. 1 is a diagram of an example of a system, according to aspects of the disclosure.

FIG. 1 is a diagram of an example of a system 100, according to aspects of the disclosure. The system 100 may include a computing device 110 and a test case repository 120. The computing device 110 may be coupled to the test case repository 120 via a communications network 130. The communications network 130 may include one or more of the Internet, a local area network (LAN), a wide area network (WAN), and/or any other suitable type of communications network. The test case repository may include a database for test cases as well as various other utilities for executing or tracking the execution of the test cases. Specifically, the test case repository 120 may be configured to store a plurality of test cases, as well as other pertinent information regarding the test cases, such as author, date of creation, and/or usage history of the test case. The test case repository 120 may be implemented by using one or more computing devices, such as the computing device 900, which is discussed further below with respect to FIG. 9.

Figure 2:
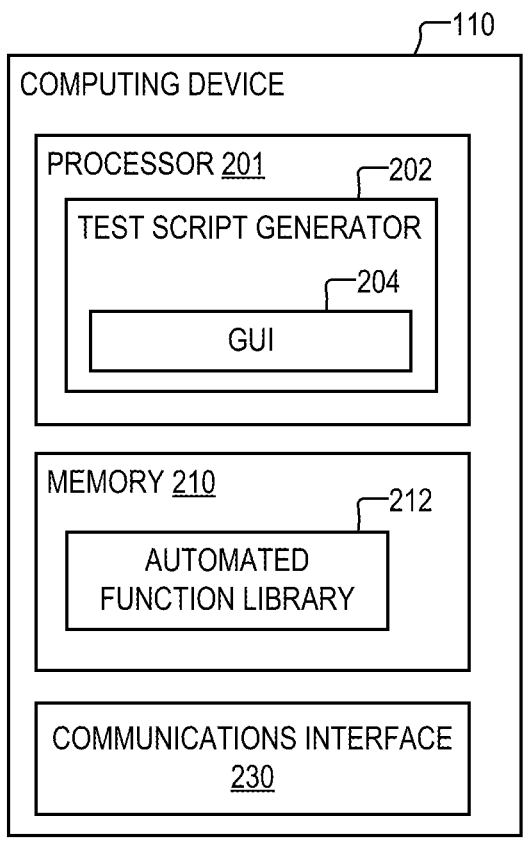
FIG. 2 is a diagram of an example of a computing device according to aspects of the disclosure.

FIG. 2 is a diagram of the computing device 110, according to aspects of the disclosure. As illustrated, the computing device 110 may include a processor 201, a memory 210, and a communications interface 230. The processor 201 may include a general-purpose processor (e.g., a RISC-V processor, an x86 processor, etc.), an application-specific integrated circuit (ASIC), a field-programmable gate array (FPGA), and/or any other suitable type of processing circuitry. The memory 210 may include any suitable type of volatile and/or non-volatile memory. For example, the memory 210 may include a hard disk (HD), a solid-state drive (SSD), a non-volatile memory express (NVMe) device, a synchronous dynamic random-access memory (SDRAM), etc. The communications interface 230 may include one or more of an Ethernet adapter, a Bluetooth adapter, and/or any other suitable type of communications interface.

The processor 201 may be configured to execute a test script generator 202. The test script generator 202 may have a graphical user interface (GUI) 204. The memory 210 may be configured to store an automated function library 212. Although the automated function library 212 is stored in the memory 210 of the computing device 110, alternative implementations are possible in which the automated function library 212 is stored in an external device (or devices). The automated function library 212 and the test script generator are discussed in further detail with respect to FIGS. 3-8.

FIG. 3 is a diagram of an example of the automated function library 212, according to aspects of the disclosure. As illustrated, the automated function library 212 may include a plurality of automated testing functions 302. Each of the automated testing functions 302 may include a body of source code 304 and a label 303 that describes the task that is performed by the body of source code 304. According to the example of FIG. 3, the label 303 in each of the automated testing functions 302 includes a natural language description of one or more testing tasks that are accomplished by the body of source code 304 in the same automated testing function 302. However, in some implementations, the label may use a structured or semi-structured notation to describe the purpose of the body of source code 304. Although in the present example the automated function library 212 includes four automated testing functions, it will be understood that the present disclosure is not limited to any number of automated testing functions being stored in the automated function library 212. Although in the example of FIG. 3 the automated function library 212 is depicted as a monolithic database, it will be understood that the automated function library 212 may include a plurality of databases that are hosted on separate systems.

Figure 4:
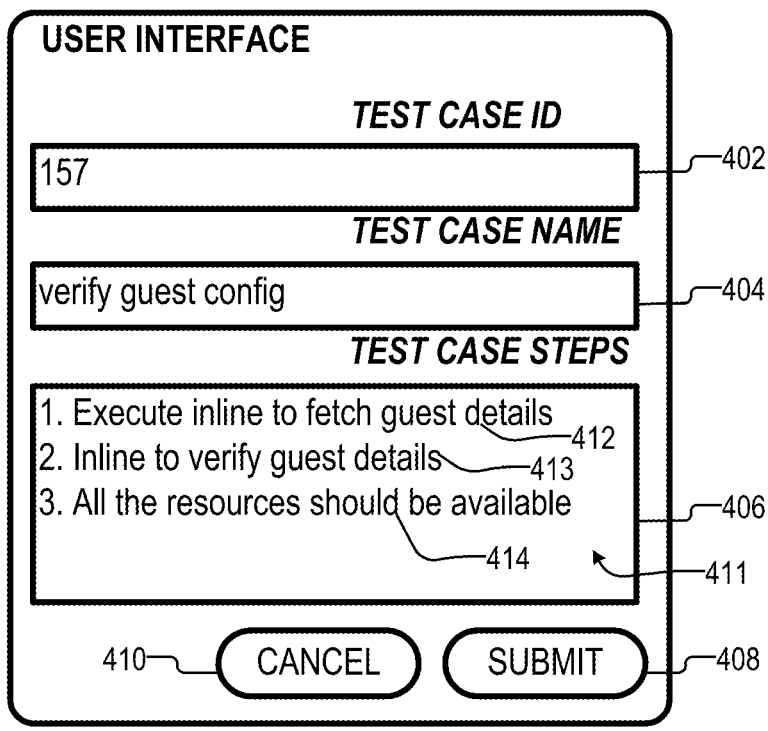
FIG. 4 is a diagram of an example of a user interface, according to aspects of the disclosure.

FIG. 4 is a diagram of an example of the GUI 204, according to aspects of the disclosure. As illustrated, the GUI 204 may include a field 402 for entering a test case ID, a field 404 for entering a test case name, and a field 406 for entering a test case. In addition, the GUI 204 may include a submit button 408 and a cancel button 410. In the example of FIG. 4, a test case 411 is entered into the field 406. The test case 411 may include steps 412-414. Each of steps 412-414 may include a natural language description of a testing task that needs to be performed on the source code that is being tested with the test case 411. When the cancel button 410 is pressed, the contents of fields 402, 404, and 406 may be discarded. When the submit button 408 is pressed, the test script generator 202 may generate an automated test script 500 based on the test case 411. FIG. 4 is provided as an example only. It will be understood that any the text input fields 402, 404, and 406 may be replaced with another type of input component or screen. Although in the example of FIG. 4 fields 402, 404 and 406 are displayed concurrently in the same screen, alternative implementations are possible in which fields 402, 404, and 406 are displayed in different fields.

Figure 5:
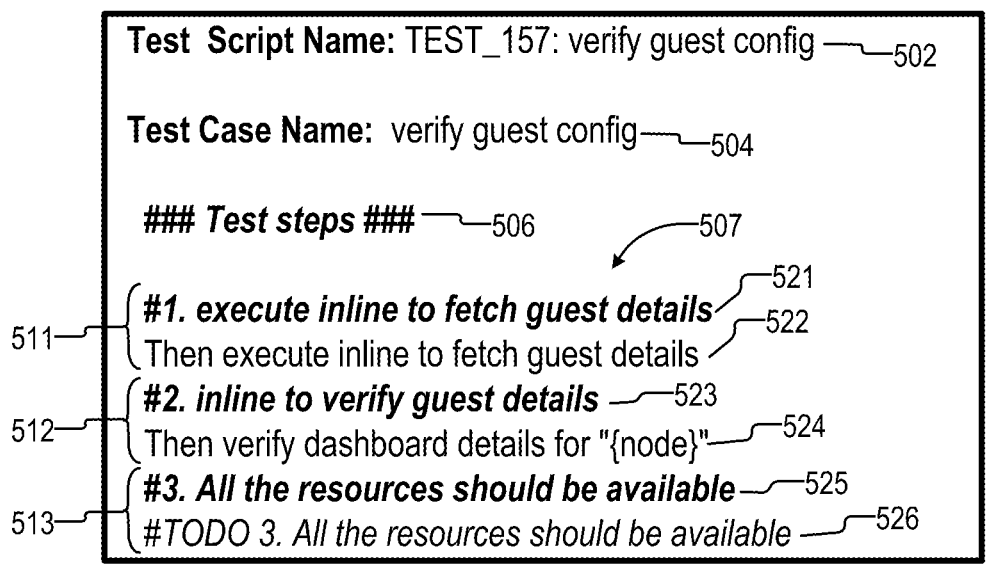
FIG. 5 is a diagram of an automated testing script, according to aspects of the disclosure.

FIG. 5 shows an example of the automated test script 500, according to aspects of the disclosure. According to the present example, the automated test script 500 is generated based on the test case 411. The automated test script 500 may include a name 502 of the automated test script 500, a name 504 of the test case that is used as a basis for generating the automated test script 500 (e.g., test case 411), and a delimiter 506 of a body 507 of the automated test script.

The body 507 of the automated test script 500 may include entries 511-513. Entry 511 may include an identifier 521 of step 412 of the test case 411, and an identifier 522 of an automated testing function that is found to match step 412 (e.g., an identifier of an automated testing function that is found to perform the action specified by the text of step 412). According to the present example, the identifier 522 identifies one of the testing functions 302 in the automated function library 212. Entry 512 may include an identifier 523 of step 413 of the test case 411, and an identifier 524 of an automated testing function that is found to match step 413 (e.g., an identifier of an automated testing function that is found to perform the action specified by the text of step 413). According to the present example, the identifier 524 identifies another one of the testing functions 302 in the automated function library 212. Entry 513 may include an identifier 525 of step 414 of the test case 411 and a placeholder 526. Placeholder 526 may indicate that no automated testing function has been found that matches the test case step 414. In some implementations, the placeholder 526 may include a "to-do" note indicating that the automated testing function for step 514 needs to be coded from scratch.

In some implementations, the automated test script 500 may be executable by an automated testing framework. In some implementations, when the automated test script 500 is executed, each of the automated testing functions that are identified (or contained) in the automated test script 500 may be invoked by the automated testing framework and used to test source code which the test case 400 is designed to test. According to the present example, each of the identifiers 521, 523, and 525 contains the entire (or portion of) language of one of the steps 412-414. However, the present disclosure is not limited to using any specific type of identifier to reference steps 412-414. According to the present example, each of the identifiers 522 and 524 includes the label of a different one of the automated testing functions 302 (shown in FIG. 3). However, the present disclosure is not limited to using any specific type of identifier to identify the automatic testing functions that are included in the automated test script 500. Moreover, in some implementations, the body of source code 304 of each of the automated testing functions 302 that are represented by identifiers 522 and 524 may be inserted in the automated test script 500 instead of (or in addition to) the identifiers 522 and 524.

Figure 6:
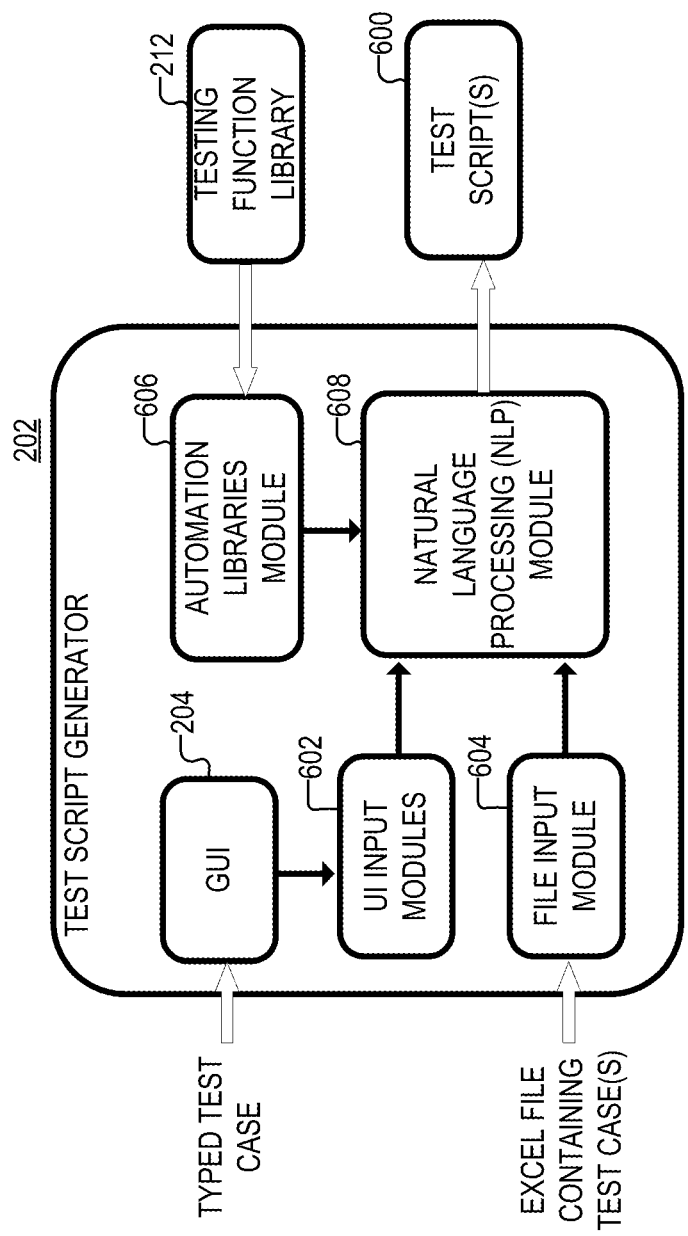
FIG. 6 is a diagram of an example of a test script generator, according to aspects of the disclosure.

FIG. 6 is a diagram illustrating aspects of the operation of the test script generator 202, according to one example. As illustrated, the test script generator may include the GUI 204, a user interface (UI) input module 602, a file input module 604, an automation libraries module 606, and a natural language processing (NLP) module 608.

The module 602 may be configured to validate the inputs provided in the GUI 204. Additionally or alternatively, the module 602 may be configured to fetch and format various data items that have been entered in the GUI 204, such as a test case that has been entered in field 406, a test case name that has been entered in field 404 (shown in FIG. 4), and a test case ID that has been entered in field 402 (shown in FIG. 4). Based on the information that is fetched by the module 602, the NLP module 608 may generate an automated test script 600. The automated test script 600 may be the same or similar to the automated test script 500, which is discussed above with respect to FIG. 5.

The module 604 may be configured to validate the contents of a file that is provided as input to the test script generator 202. According to the present example, the file includes an Excel™ spreadsheet, however the present disclosure is not limited to using any specific type of file. The file may include a plurality of test cases that are batch-processed by the test script generator 202. For each of the test cases contained in the file, the test script generator 202 may generate a different respective automated test script 600. Each of the automated test scripts 600 may be the same or similar to the automated test script 500, which is discussed above with respect to FIG. 5.

The module 606 may be configured to fetch data from the automated function library 212, format the fetched data in accordance to a predetermined format, and provide the fetched data to the NLP module 608.

The NLP module 608 may be configured to process any test case that is received from modules 602 and 604, and generate an automated test script 600 based on the test case. In some implementations, the NLP module 608 may be configured to execute the process 700, which is discussed further below with respect to FIGS. 7A-B. According to the present example, each of modules 602-608 is implemented in software. However, alternative implementations are possible in which any of modules 602-608 is implemented in hardware or as a combination of software and hardware.

Figure 7A:
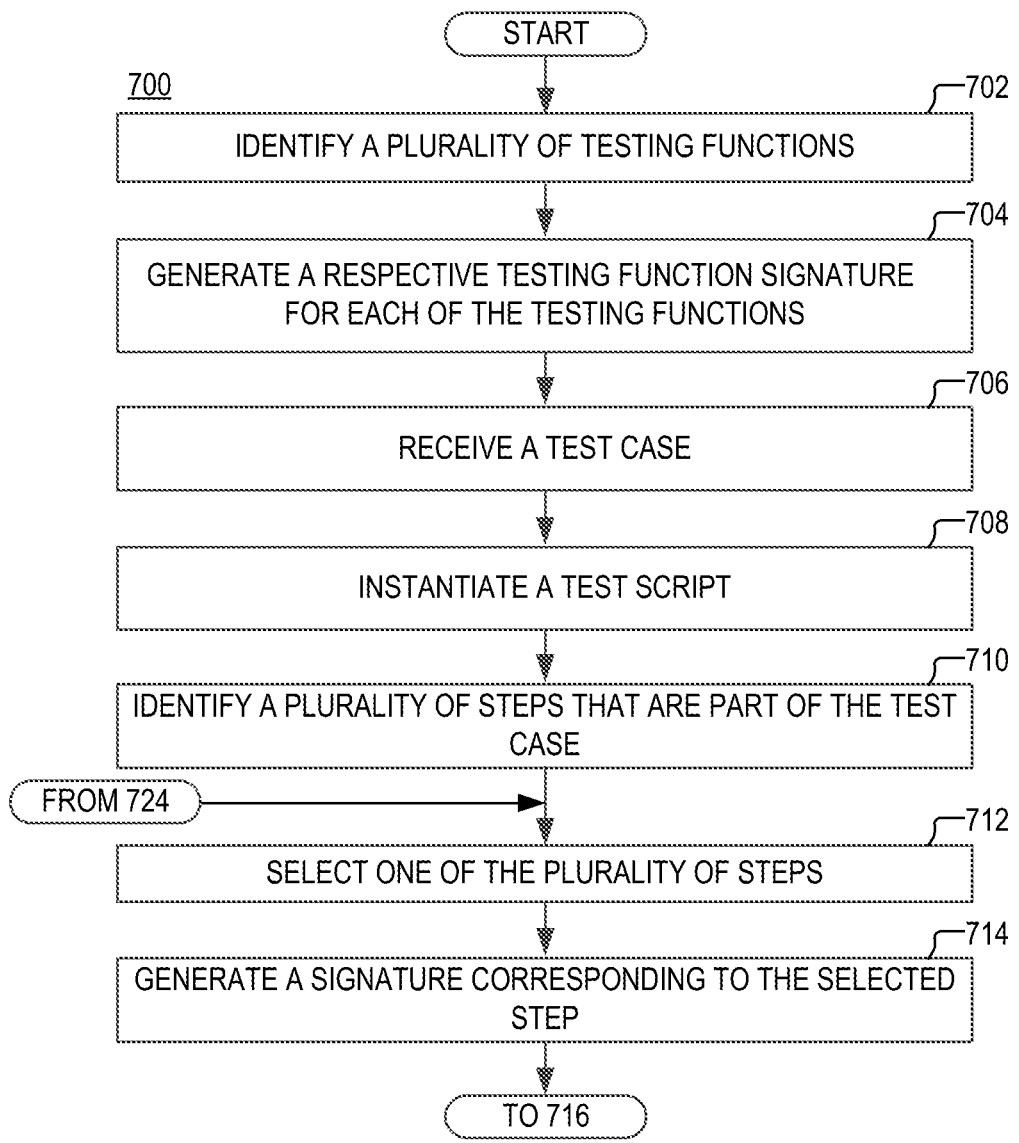
FIG. 7A is a flowchart of an example of a process, according to aspects of the disclosure.
Figure 7B:
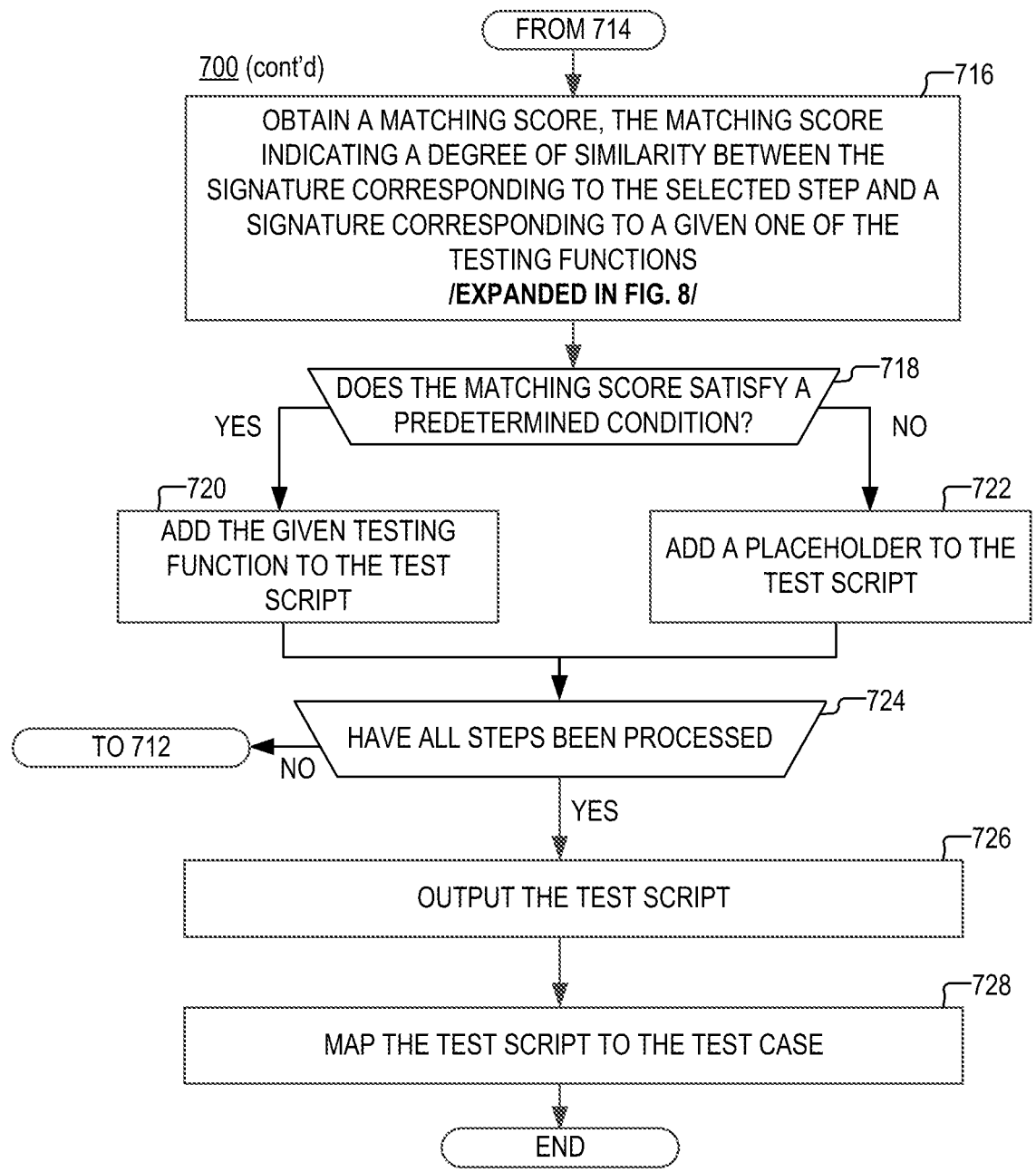
FIG. 7B is a flowchart of an example of a process, according to aspects of the disclosure.

FIGS. 7A-B show an example of a process 700, according to aspects of the disclosure. According to the present example, the process 700 is performed by the test script generator 202 and/or the NLP module 608 (shown in FIG. 6). However, the present disclosure is not limited to any specific entity performing the process 700.

At step 702, a plurality of testing functions is identified. Each of the testing functions may be the same or similar to the testing functions 302 that are discussed above with respect to FIG. 3. In some implementations, identifying the testing functions may include retrieving the testing functions from the automated function library 212.

At step 704, a different respective signature is generated for each of the identified testing functions. In some implementations, the signature of each testing function may be generated based on the label of this testing function (e.g., see labels 303 shown in FIG. 3). Additionally or alternatively, in some implementations, the signature of each testing function may be generated by using text2vec and/or any other suitable type of application programming interface (API). In some implementations, the signature may be generated after de-cluttering, stop word removal, and/or other pre-processing is performed on the label. Additionally or alternatively, in some implementations, the signature of a particular testing function label (and/or testing function) may include a bit string, where each bit corresponds to a different respective word. The value of each bit may be set to '1' if the bit's respective word is present in the label; otherwise, if the bit's respective word is not present in the label, the value of the bit may be set to '0'.

At step 706, a test case is received. The test case may be the same or similar to the test case 411, which is discussed above with respect to FIG. 4. The name and ID of the test case, as well as any other suitable information associated with the test case, may also be received at step 706.

At step 708, an automated test script is instantiated. The automated test script may be the same or similar to the automated test script 500, which is discussed above with respect to FIG. 5. Instantiating the automated test script may include generating a blank file or another object for the automated test script. After the blank file or object is generated, a name may be generated for the automated test script (e.g., based on the name and id of the test case) and inserted into the object or file. In addition, the name of the test case (received at step 706) may also be inserted into the file or object.

At step 710, a plurality of test case steps is identified that is part of the test case (received at step 706). The test case steps may be the same or similar to the steps 412-414, which are discussed above with respect to FIG. 4.

At step 712, one of the plurality of test case steps is selected. The selected test case step may be one that has not been selected during a previous iteration of steps 712-722.

At step 714, a signature for the selected test case step is generated. In some implementations, the signature of each testing function may be generated by using text2vec and/or any other suitable type of application programming interface (API). In some implementations, the signature may be generated after de-cluttering, stop word removal, and/or other pre-processing is performed on the test case step. Additionally or alternatively, in some implementations, the signature of a particular testing function label (and/or testing function) may include a bit string, where each bit corresponds to a different respective word. The value of each bit may be set to '1' if the bit's respective word is present in the test case step; otherwise, if the bit's respective word is not present in the test case step, the value of the bit may be set to '0'.

At step 716 a matching score is obtained for the test case step (selected at step 712). The matching score may be generated, at least in part, based on the signature for the test case step (generated at step 714) and one of the signatures generated at step 704. The matching score may indicate a degree of similarity between the signature of the test case step (generated at step 712) and the signature of a given one of the plurality of testing functions (identified at step 702). In some implementations, the matching score may be obtained in accordance with a process 800, which is discussed further below with respect to FIG. 8.

At step 718, a determination is made if the matching score satisfies a predetermined condition. In some implementations, the predetermined condition may be satisfied if the matching is indicative that the degree of similarity between the test case step and the given testing function exceeds a predetermined level. Additionally or alternatively, in some implementations, the condition may be satisfied if the value of the matching score exceeds a predetermined threshold. If the predetermined condition is satisfied, the process 700 proceeds to step 720. Otherwise, the process 700 proceeds to step 722 of the process 700.

At step 720, the given testing function is added to the automated test script (instantiated at step 708). The given testing function may be the same or similar to any of the testing functions 302, which are discussed above with respect to FIG. 3. It will be recalled that the given testing function is the testing function whose signature is used for generating the matching score (obtained at step 716). As is discussed further below with respect to FIG. 8, the given testing function may be one of the plurality of functions (identified at step 702) that is the most similar to the test case step (selected at step 712). In some implementations, adding the given testing function may include inserting into the automated test script a reference to the given automated testing function. Additionally or alternatively, in some implementations, adding the given testing function may include inserting into the automated test script an identifier of the given testing function. Additionally or alternatively, in some implementations, adding the given testing function may include inserting into the automated test script the label of the given testing function. Additionally or alternatively, in some implementations, adding the given testing function may include inserting into the automated test script the body of the given testing function. In some implementations, the process 700 may insert, in the automated test script, the language of the test case step (selected at step 712) and/or an identifier corresponding to the test case step.

At step 722, a placeholder is added to the testing function. In some implementations, the placeholder may be the same or similar to the placeholder 526, which is discussed above with respect to FIG. 5. The placeholder may include any suitable number, string, or alphanumerical string that, at least in part, indicates that no automated testing function has been found that matches the test case step (selected at step 712). In some implementations, the process 700 may insert, in the automated test script, the language of the test case step (selected at step 712) and/or an identifier corresponding to the test case step.

At step 724, a determination is made if all test case steps (identified at step 720) have been processed. If all test case steps have been processed, the process 700 proceeds to step 726. Otherwise, the process 700 returns to step 712, and steps 712-722 are repeated for another one of the test case steps (identified at step 710).

At step 726, the automated test script is output. Outputting the automated test script may include one or more of displaying the automated test script (or an identifier of the automated test script) on a display device, storing the automated test script at a predetermined memory location, and/or transmitting the automated test script over a communications network.

At step 728, the automated test script is mapped to the test case. In some implementations, mapping the automated test script may include identifying a test case repository that is holding the test case, storing the automated test script or a link (or another identifier) to the automated test script in the test case repository, and causing the test case repository to store the link (or identifier) in a record corresponding to the test case. Additionally or alternatively, in some implementations, mapping the automated test script to the test case may include creating a database record that includes identifiers of the automated test script and test case and storing the database record into a database that is used by software testers (or an automated testing framework) to identify relevant automated test scripts.

According to aspects of the disclosure, an automated testing function matches a particular test case step, when the automated testing function is configured to perform the action described by the test case step. As discussed above, in the example of FIGS. 7A-B, a determination is made if any of the automated testing functions (identified at step 702) matches a particular test case step. In some implementations, the determination can be made by: (i) comparing a signature of the automated testing function to a signature of the test case step to obtain a similarity score, and (ii) determining whether the similarity score is indicative of a similarity level that exceeds a predetermined threshold. The process 700 is provided as an example only. At least some of the steps in the process 700 may be performed concurrently, in a different order, or altogether omitted. Throughout the disclosure, the terms "testing function" and "automated testing function" are used interchangeably.

Figure 8:
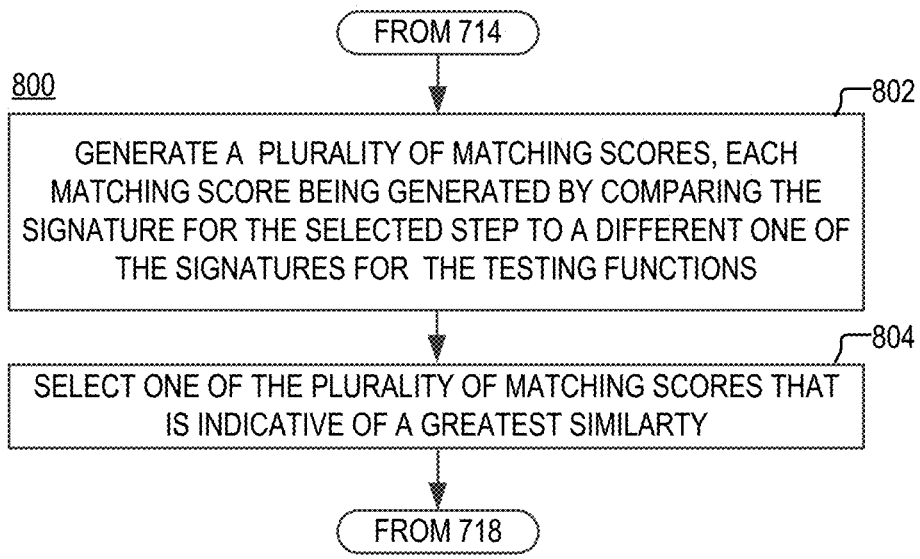
FIG. 8 is a flowchart of an example of a process, according to aspects of the disclosure.

FIG. 8 is a flowchart of an example of a process 800 for obtaining a matching score, as specified by step 716 of the process 700. At step 802, a plurality of matching scores is generated. Each of the plurality of matching scores may be obtained by comparing the test case step signature (generated at step 714) to a different one of the plurality of automated testing function signatures (generated at step 704). In some implementations, each of the matching scores may be the cosine distance between the test case step signature and a different one of the plurality of automated testing function signatures. Each matching score may be indicative of a degree of similarity between the test case step signature and the score's corresponding automated testing function signature. At step 804, one of the plurality of matching scores is selected. In some implementations, a matching score may be selected that is indicative of a greatest similarity to the test case signature (among all of the test scores generated at step 802). Additionally or alternatively, in some implementations, the largest matching score (among all of the test scores generated at step 802) may be selected.

Figure 9:
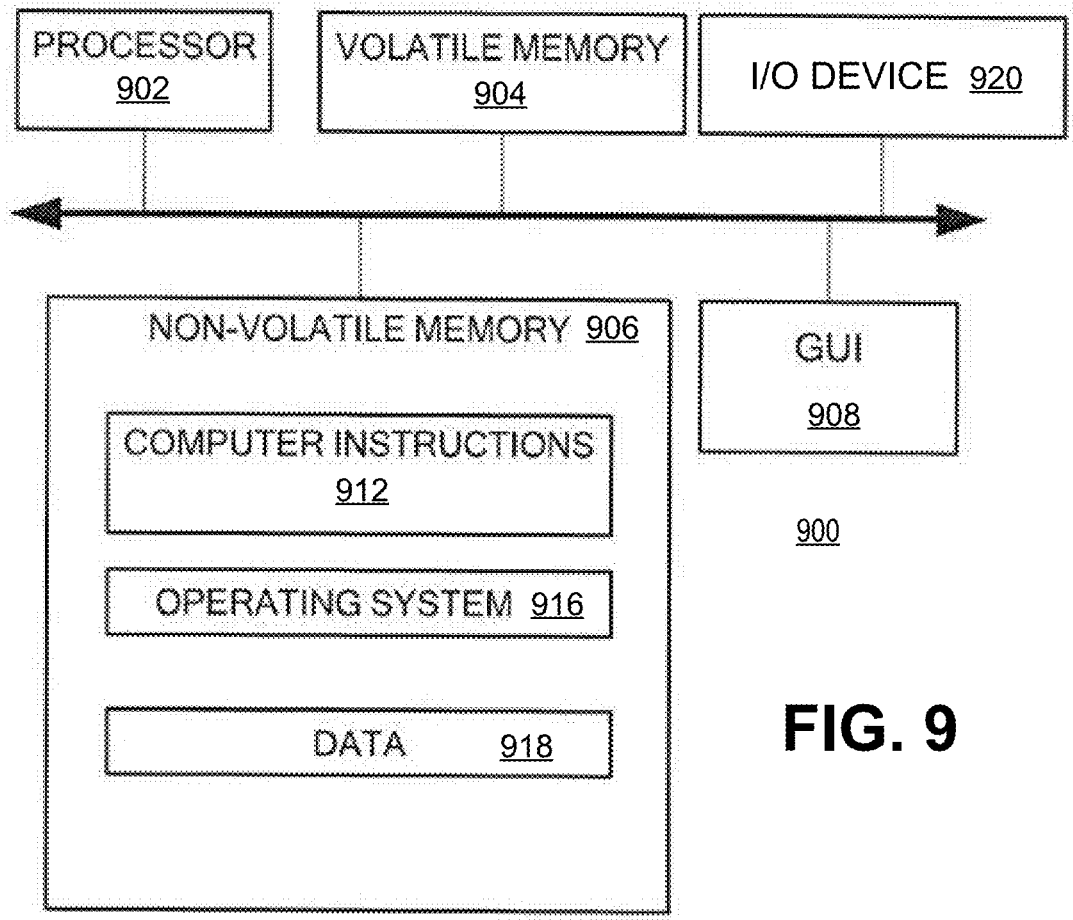
FIG. 9 is a diagram of an example of a computing device, according to aspects of the disclosure.

Referring to FIG. 9, in some embodiments, a computer 900 may include processor 902, volatile memory 904 (e.g., RAM), non-volatile memory 906 (e.g., a hard disk drive, a solid-state drive such as a flash drive, a hybrid magnetic and solid-state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 908 or received from I/O device 920.

FIGS. 1-9 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-9 may be performed in parallel, in a different order, or altogether omitted. The term "database" as used throughout the disclosure may refer to one or more data structures that are configured to store information. A database may be implemented as one or more files, one or more data structures, a relational database (e.g., an SQL database), a non-relational database and/or any other suitable type of database. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.(½₃)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    receiving a first test case identifying a plurality of test case steps;
    generating a plurality of first signatures, each of the plurality of first signatures being generated based on a different one of the plurality of test case steps;
    generating a plurality of second signatures, each of the plurality of second signatures corresponding to a different one of a plurality of testing functions, each of the plurality of second signatures being generated based on a respective label that is associated with the testing function that corresponds to the second signature;
    processing any given one of the plurality of test case steps, wherein the processing includes: (i) identifying a matching score that corresponds to the given test case step, the matching score being indicative of a degree of similarity between one of the plurality of first signatures that corresponds to the given test case step and a respective one of the plurality of second signatures, (ii) detecting whether the matching score satisfies a predetermined condition, and (iii) inserting a respective one of the plurality of testing functions that corresponds to the respective second signature into a first automated test script, the respective testing function being inserted only when the predetermined condition is satisfied; and
    executing the first automated test script on a testing system.

2. The method of claim 1, wherein processing any given one of the plurality of test case steps further includes inserting a placeholder that corresponds to the given test case step into the first automated test script when the matching score that corresponds to the given test case step does not satisfy the predetermined condition.

3. The method of claim 1, wherein identifying the matching score that corresponds any given test case step includes: calculating a plurality of matching scores, each of the plurality of matching scores being indicative of a degree of similarity between one of the plurality of first signatures that corresponds to the given test case step and a different one of the plurality of second signatures, and selecting one of the plurality of matching scores that is indicative of a greatest similarity.

4. The method of claim 1, wherein receiving the first test case includes receiving a file that includes the first test case and a second test case, the method further comprising generating a second automated test script based on the second test case.

5. The method of claim 1, wherein outputting the first automated test script includes storing the first automated test script in a predetermined storage location.

6. The method of claim 1, wherein outputting the first automated test script includes storing the first automated test script into a test case repository and causing the test case repository to identify the first automated test script as being generated based on the first test case.

7. The method of claim 1, wherein each of the test case steps includes a natural language description of one or more testing tasks, and the respective label that corresponds to any of the plurality of testing functions includes a natural language description of a purpose of the testing function.

8. The method of claim 1, wherein the respective label that corresponds to any of the plurality of testing functions is part of the testing function.

9. A system comprising:
    a memory; and
    at least one processor operatively coupled to the memory, the at least one processor being configured to perform the operations of:
    receiving a first test case identifying a plurality of test case steps;
    generating a plurality of first signatures, each of the plurality of first signatures being generated based on a different one of the plurality of test case steps;
    generating a plurality of second signatures, each of the plurality of second signatures corresponding to a different one of a plurality of testing functions, each of the plurality of second signatures being generated based on a respective label that is associated with the testing function that corresponds to the second signature;
    processing any given one of the plurality of test case steps, wherein the processing includes: (i) identifying a matching score that corresponds to the given test case step, the matching score being indicative of a degree of similarity between one of the plurality of first signatures that corresponds to the given test case step and a respective one of the plurality of second signatures, (ii) detecting whether the matching score satisfies a predetermined condition, and (iii) inserting a respective one of the plurality of testing functions that corresponds to the respective second signature into a first automated test script, the respective testing function being inserted only when the predetermined condition is satisfied; and
    outputting the first automated test script, wherein, after the first automated test script is output, the first automated test script is executed on a testing system.

10. The system of claim 9, wherein processing any given one of the plurality of test case steps further includes inserting a placeholder that corresponds to the given test case step into the first automated test script when the matching score that corresponds to the given test case step does not satisfy the predetermined condition.

11. The system of claim 9, wherein identifying the matching score that corresponds any given test case step includes: calculating a plurality of matching scores, each of the plurality of matching scores being indicative of a degree of similarity between one of the plurality of first signatures that corresponds to the given test case step and a different one of the plurality of second signatures, and selecting one of the plurality of matching scores that is indicative of a greatest similarity.

12. The system of claim 9, wherein receiving the first test case includes receiving a file that includes the first test case and a second test case, wherein the at least one processor is further configured to perform the operation of generating a second automated test script based on the second test case.

13. The system of claim 9, wherein outputting the first automated test script includes storing the first automated test script in a predetermined storage location.

14. The system of claim 9, wherein outputting the first automated test script includes storing the first automated test script into a test case repository and causing the test case repository to identify the first automated test script as being generated based on the first test case.

15. The system of claim 9, wherein each of the test case steps includes a natural language description of one or more testing tasks, and the respective label that corresponds to any of the plurality of testing functions includes a natural language description of a purpose of the testing function.

16. The system of claim 9, wherein the respective label that corresponds to any of the plurality of testing functions is part of the testing function.

17. A non-transitory computer-readable medium storing a plurality of processor-executable instructions, which, when executed by at least one processor, cause the at least one processor to perform the operations of:
  receiving a first test case identifying a plurality of test case steps;
  generating a plurality of first signatures, each of the plurality of first signatures being generated based on a different one of the plurality of test case steps;
  generating a plurality of second signatures, each of the plurality of second signatures corresponding to a different one of a plurality of testing functions, each of the plurality of second signatures being generated based on a respective label that is associated with the testing function that corresponds to the second signature;
  processing any given one of the plurality of test case steps, wherein the processing includes: (i) identifying a matching score that corresponds to the given test case step, the matching score being indicative of a degree of similarity between one of the plurality of first signatures that corresponds to the given test case step and a respective one of the plurality of second signatures, (ii) detecting whether the matching score satisfies a predetermined condition, and (iii) inserting a respective one of the plurality of testing functions that corresponds to the respective second signature into a first automated test script, the respective testing function being inserted only when the predetermined condition is satisfied; and
  outputting the first automated test script, wherein, after the first automated test script is output, the first automated test script is executed on a testing system.

18. The non-transitory computer-readable medium of claim 17, wherein processing any given one of the plurality of test case steps further includes inserting a placeholder that corresponds to the given test case step into the first automated test script when the matching score that corresponds to the given test case step does not satisfy the predetermined condition.

19. The non-transitory computer-readable medium of claim 17, wherein identifying the matching score that corresponds any given test case step includes: calculating a plurality of matching scores, each of the plurality of matching scores being indicative of a degree of similarity between one of the plurality of first signatures that corresponds to the given test case step and a different one of the plurality of second signatures, and selecting a one of the plurality of matching scores that is indicative of a greatest similarity.

20. The non-transitory computer-readable medium of claim 17, wherein receiving the first test case includes receiving a file that includes the first test case and a second test case, wherein the one or more processor-executable instruction, when executed by the at least one processor, further cause the at least one processor to perform the operation of comprising generating a second automated test script based on the second test case.

* * * * *